Patented May 13, 1941

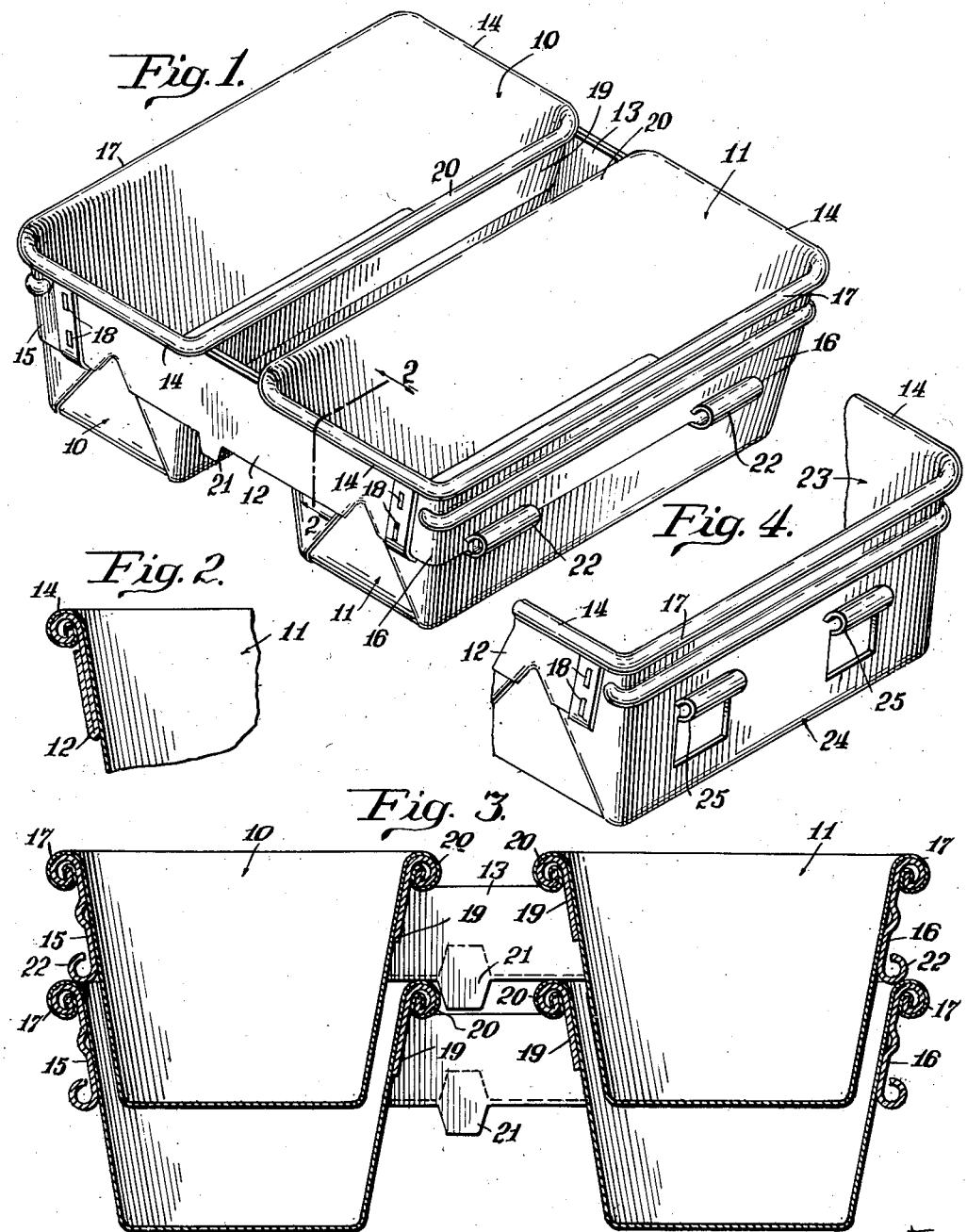

2,241,707

UNITED STATES PATENT OFFICE 2,241,707

BAKING PAN

Adrien L. Langel, Chicago, Ill., assignor to Chicago Metallic Manufacturing Company, Chicago, Ill., a corporation of Illinois Application September 15, 1939, Serial No. 295,020

5 Claims. (Cl. 53—6)

This invention relates to baking pans and particularly to a multiple pan arrangement, and it has for its object the provision of a new and improved form and arrangement of parts comprising stabilizing means for preventing a stack of nested pans from tipping over.

The arrangement as shown comprises a plurality of stabilizing members in the form of beads or sleeves formed integrally with the frame by which the multiple pan unit is surrounded for connecting and reinforcing the pans, the sleeves in the arrangement shown being open at one side so as to be adapted to yield slightly for cushioning the pans as they are piled one above the other in nested relation.

It is another object of this invention to improve constructions of this type in sundry details hereinafter pointed out. The preferred means by which the several objects have been attained are illustrated in the accompanying drawing, in which—

Fig. 1 is a perspective view of a multiple pan structure embodying the invention;

Fig. 2 is a vertical cross sectional view taken substantially at the line 2—2 of Fig. 1;

Fig. 3 is a vertical cross sectional view through two structures of the type shown in Fig. 1 with such structures stacked in nested relation to each other; and Fig. 4 is a view similar to a portion of Fig. 1 but showing a modified form of arrangement.

Referring now to Figs. 1, 2 and 3, in which corresponding parts are indicated by the same reference characters, 10 and 11 indicate baking pans pressed into form from sheet metal and arranged side by side in spaced relation to each other. At opposite ends of the pans, end bars 12 and 13 are connected rigidly with the pans. In the construction illustrated, the bars 12 and 13 are of double thickness, being doubled over along longitudinal lines so as to make the inner plies of greater width than the outer plies. The upper edge portions of the inner plies of these end bars are rolled over with the upper edge portions of the end walls of the pans into beads or sleeves as indicated at 14 in Fig. 2 into interlocking engagement with said end walls so as to connect said end bars rigidly with the pans. At the outer side faces of the pans 10 and 11, bars 15 and 16 are provided (see Fig. 3), having their upper edge portions rolled over with the upper edge portions of the sides of the pans into beads or sleeves as indicated at 17 in Fig. 3 so as to connect said bars 15 and 16 rigidly with the pans. At their ends, the bars 15 and 16 are turned around the corners of the pan and brought into engagement with the outer faces of the end bars 12 and 13 to which they are spot-welded as indicated at 18 in Fig. 1, being offset outwardly at their end portions so as to have a snug fit with said end bars. The arrangement is such that the end bars 12 and 13 and the side bars 15 and 16 are very rigidly connected to the pans and to each other for making the structure as a whole extremely strong so as to be capable of withstanding long continued use under trying conditions.

For further reinforcing the structure, bars 19 are provided in the form of strips of metal positioned along the outer faces of the inner side walls of the pans in the spaces between the pans, as is clearly shown in Fig. 3, such bars 19 having their upper edge portions rolled over with the adjacent side walls of the pans in the form of beads or sleeves as indicated at 20 in Fig. 3.

Upon the lower edges of the end bars 12 and 13, spacing lugs 21 are provided, extending downwardly from the lower edges of said end bars. The arrangement is such that when two of the pan structures are nested as shown in Fig. 3 the lug 21 of an upper pan stands adjacent to the bead 20 of the next lower pan for assisting in holding the pans in centered position.

Additional means is provided serving additionally to center two nested pan structures transversely with respect to each other. Such additional centering means in the arrangement shown comprises beads or sleeves 22 formed on the lower edge portions of the side bars 15 and 16, as is clearly shown in Fig. 3. As shown in Fig. 3, the bead 22 at each side of the upper structure rests directly upon the bead 17 of the lower structure so as to center the upper pan accurately with respect to the lower pan. Inasmuch as the beads 17 and 22 are open at one side, they have a certain amount of resiliency which is effective for cushioning one pan with respect to the other for stacking purposes.

In the arrangement shown in Fig. 4, a pan 23 is shown similar to the pan 11 but having a modified form of side bar thereon. In the arrangement shown in Fig. 4, a wide bar 24 is shown in lieu of the comparatively narrower side bar 16 as shown in Fig. 1. The arrangement is similar to that already described, except that in the structure of Fig. 4 stabilizing beads 25 are employed in lieu of the centering and stabilizing beads 22 above described, such beads 25 being formed from tongues struck up out of the metal of the bar or plate 24.

While the form and arrangement of parts as shown in the drawing and as above described are preferred, the invention is not to be limited to such form and arrangement except so far as the claims may be so limited, it being understood that changes might well be made in the construction without departing from the spirit of the invention.

I claim:

1. In a baking pan structure, the combination of a plurality of pans pressed into form from sheet metal and arranged side by side in spaced relation to each other, end bars extending across the ends of the pans and connected therewith for holding the pans rigidly in position with respect to each other, side bars extending along the outer side faces of the outside pans and connected rigidly both with said pans and with said end bars, and vertically yielding resilient stabilizing members carried by said side bars in position to engage the side walls of a similar pan structure when nested therewith for supporting one structure in centered position with respect to the other.

2. In a baking pan structure, the combination of a plurality of pans pressed into form from sheet metal and arranged side by side in spaced relation to each other, end bars extending across the ends of the pans and connected therewith for holding the pans rigidly in position with respect to each other, side bars extending along the outer side faces of the outside pans and connected rigidly both with said pans and with said end bars, and resilient stabilizing members carried by said side bars in the form of rounded beads or sleeves rolled into form from the metal of said bars in position to engage the side walls of a similar pan structure when nested therewith for supporting one structure in centered position with respect to the other.

3. In a baking pan structure, the combination of a plurality of pans pressed into form from sheet metal and arranged side by side in spaced relation to each other, end bars extending across the ends of the pans and connected therewith for holding the pans rigidly in position with respect to each other, side bars extending along the outer side faces of the outside pans and connected rigidly both with said pans and with said end bars, and resilient stabilizing members carried by said side bars at opposite end portions of the pan structure and located a short distance below the upper edges of said side bars in position to engage the side walls of a similar pan structure when nested therewith for supporting one structure in centered position with respect to the other, each of said stabilizing members being in the form of a sleeve rolled into form from a tongue of metal formed integrally with the bar with an open space in the sleeve at the end of the tongue.

4. In a baking pan structure, the combination of a plurality of pans pressed into form from sheet metal and arranged side by side in spaced relation to each other, end bars extending across the ends of the pans and connected therewith for holding the pans rigidly in position with respect to each other, side bars extending along the outer side faces of the outside pans and connected rigidly both with said pans and with said end bars, stabilizing means carried by said side bars adapted by engagement with the side walls of a similar pan structure when nested therewith to support one structure normally in centered position with respect to the other, and lugs extending downwardly from the lower edge portions of said end bars in such position that each of said lugs of an upper pan structure engages the outside face of the side wall of one only of the pans of a lower nested pan structure so as to prevent movement of the upper pan structure in one direction out of centered position.

5. In a baking pan structure, the combination of a plurality of pans pressed into form from sheet metal and arranged side by side in spaced relation to each other, end bars extending across the ends of the pans and having their upper edge portions rolled over tightly with the end walls of the pans into the form of beads, side bars extending along the outer side faces of the outside pans and having their upper edge portions rolled over tightly with the side walls of the pans into the form of beads, stabilizing members carried by said side bars in the form of rounded beads or sleeves rolled into form from the metal of said bars in position to engage the side walls of a similar pan structure when nested therewith for supporting one pan structure in centered position with respect to the other, and lugs extending downwardly from the lower edge portions of said end bars in closer proximity to one pan than to the other in such position that each lug engages the outer face of the side wall of one only of the pans of a lower nested pan structure so as to prevent movement of the upper pan structure in one direction out of centered position.

ADRIEN L. LANGEL.